United States Patent [19]

Hemman

[11] Patent Number: 4,816,148
[45] Date of Patent: Mar. 28, 1989

[54] MULTI-STAGE STRAINING APPARATUS

[76] Inventor: Edward B. Hemman, 2107 9th St., Sanger, Calif. 93657

[21] Appl. No.: 109,205

[22] Filed: Oct. 16, 1987

Related U.S. Application Data

[63] Continuation-in-part of Ser. No. 947,867, Dec. 30, 1986, Pat. No. 4,731,177.

[51] Int. Cl.⁴ ............................................. B01D 25/02
[52] U.S. Cl. .................... 210/256; 210/257.1; 210/261; 210/338; 210/475
[58] Field of Search ............ 210/256, 257.1, 261, 210/262, 335, 337–339, 474, 476, 499, 477, 475

[56] References Cited

U.S. PATENT DOCUMENTS

| 347,581 | 8/1886 | Dodge | 210/337 |
|---|---|---|---|
| 433,659 | 8/1890 | Schermerhorn | 210/315 |
| 557,399 | 3/1896 | Knight | 210/103 |
| 602,488 | 4/1898 | Tice et al. | 210/476 |
| 942,121 | 12/1909 | White | 210/337 |
| 1,044,074 | 11/1912 | Nugent | 210/338 |
| 1,208,882 | 12/1916 | Young | 210/476 |
| 1,536,890 | 5/1925 | Lagemann | 210/476 |
| 1,556,993 | 10/1925 | Hulscher | 210/337 |
| 1,831,290 | 11/1931 | Daniel | 210/464 |
| 1,989,034 | 1/1935 | Anderson et al. | 210/238 |
| 2,312,091 | 2/1943 | Gray | 210/338 |
| 3,040,897 | 6/1962 | Holman | 210/464 |
| 3,348,689 | 10/1967 | Kraissl, Jr. | 210/238 |
| 3,940,065 | 2/1976 | Ware et al. | 239/146 |

Primary Examiner—Ivars Cintins
Attorney, Agent, or Firm—Worrel & Worrel

[57] ABSTRACT

An apparatus for removing foreign matter from a solution of paint or the like. The apparatus includes a vacuous vessel for receiving the paint solution which has been strained; a straining assembly which has a main body mounted in fluid communication with the vacuous vessel; and a plurality of removable filter elements positioned internally of the main body and operable selectively to remove foreign matter from the solution of paint which is passed therethrough.

17 Claims, 4 Drawing Sheets

MULTI-STAGE STRAINING APPARATUS

BACKGROUND OF THE INVENTION

1. Field of the Invention

This application is a continuation-in-part of Application Ser. No. 06/947,867, filed on Dec. 30, 1986, now U.S. Pat. No. 4,731,177.

The present invention relates to a multi-stage straining apparatus, and more particularly to such an apparatus which is uniquely well suited to remove debris and other particulate matter from a solution of paint or the like by employing a plurality of filtering elements which are advantageously positioned to capture the foreign matter and/or debris, and which further mounts a stirring assembly operable to prevent the separation of the solution of paint into its constituent elements or the formation of a skim film on the top surface thereof, the apparatus having particular utility for producing a homogeneous paint solution which can be effectively utilized by variously configured spraying apparatus.

2. Description of the Prior Art

There are a variety of solutions which must, from time to time, be dispensed from a batch source of that solution and wherein the solution that is removed from the batch may vary substantially from one instance to the next. For example, paint is routinely dispensed from variously dimensioned containers which range in volume from one gallon to as large as fifty gallons depending in large measure upon the size the painting project being undertaken. As should be understood, the application of paint in a commercial setting, is a very highly labor intensive operation, and therefore quite expensive whether such painting is performed by utilizing conventional brushes and rollers or by employing variously configured spraying apparatus.

As the expense of employing manual labor has increased over the years due in part to the minimum wage laws and other legislation, assorted manufacturers have carried out research directed towards developing improved lightweight spraying apparatus which permits a painter to dispense ever increasing amounts of paint over larger surfaces areas per hour. This development activity has reaped numerous results in the art fields of electric and pneumatically actuated spray guns. Although the prior art is replete with numerous examples of spraying apparatuses for dispensing paint with greater efficiency these spraying apparatus suffer from a multiplicity of common problems which have detracted from their usefulness. A lack of dependability as the result of jamming or clogging the operative mechanisms has been the primary impediment. This jamming or clogging of the spraying apparatus has been due, in large measure, to the presence of foreign matter and other debris in the paint solution.

Attempts made in the prior art to address the problems associated with jamming or clogging of the operational mechanism of a spraying apparatus have assumed various forms. For instance, many painters employing such spraying devices will, as a matter of course, thin their paint using commercially available solvents to prevent the paint from clogging or otherwise jamming the operational components. In other instances, the painter may utilize a flexible filter bag through which the paint is first passed, for the purpose of removing any debris and foreign matter which may be present in the paint. It should be understood, of course, that debris may form in the paint solution once it has been strained. For example, a skim film may form on the top surface of the paint as a result of the paint being exposed to air or to extremely low or high ambient temperatures for prolonged periods of time. Furthermore, if the solution of paint is allowed to stand for a substantial period of time, the solution of paint may begin to separate into its constituent elements thus causing the formation of various sized particles which may cause the operational mechanism of the spraying apparatus to jam.

Attempts in the prior art to provide a means for removing debris and foreign matter from a solution of paint have included a wide range of filter assemblies which are attached to the end of a spray line, the spray line being adapted to withdraw paint from a batched source and to supply it to the spraying apparatus. These assemblies have operated with some degree of success, however they have significant limitations inasmuch as they routinely become coated with debris and other foreign matter which are present in the paint solution and therefore require periodic cleaning and inspection.

While some of the prior art practices and devices have operated with varying degrees of success, they are unsatisfactory in one or more respects. For example, some of these devices and practices are cumbersome; do not routinely produce a homogenous paint solution free from debris and other matter; and are often not convenient to employ. Others take exceedingly great amounts of time to use; or are otherwise useful on one occasion only. Yet another deficiency common among the prior art devices, is that they generally require constant attention or periodic monitoring to determine if they are operating effectively. Moreover in the instance where the paint after filtering has been allowed to stand for a prolonged period of time, the formation of a skim film, or the separation of the paint into its constituent elements, can only be corrected by remixing the paint or otherwise agitating it for purposes of resuspending the constituent elements back into a substantially homogeneous solution. This is, of course, a rather time consuming task. Finally, in those instances where the ambient air temperature is significantly below 78° F., the task of remixing may need to be repeatedly performed in order to insure the trouble-free operation of the spraying apparatus inasmuch as a skim film or separation of the paint into its constituent elements will tend to occur rapidly at these lower ambient air temperatures.

Therefore, it has long been known that it would be desirable to have a multi-stage straining apparatus for paint or the like which is capable of producing a homogeneous paint solution; which is operable to prevent the formation of a skim film or the separation of the paint into its constituent elements such that the paint can be used by a spraying apparatus; which is easy to clean and maintain; which is inexpensive to manufacture and sell; and which is characterized by ease of utilization.

OBJECTS AND SUMMARY OF THE INVENTION

Therefore, it is an object of the present invention to provide an improved multi-stage straining apparatus for removing debris and foreign matter from a solution of paint or the like.

Another object is to provide a multi-stage straining apparatus which is so constructed that substantially all of the debris and other foreign matter suspended in a paint solution is effectively removed therefrom.

Another object is to provide such a multi-stage straining apparatus which is mounted in fluid-flow communication with a vacuous vessel by utilizing a support member.

Another object is to provide a multi-stage straining apparatus which has a stirring assembly borne by the vacuous vessel and which is operable to agitate the solution of paint thereby preventing the formation of a skim film on the top surface of the paint which has been strained, and which further is adapted to inhibit the solution of paint from separating into its constituent elements.

Another object is to provide such a multi-stage straining apparatus which has a plurality of filter assemblies of substantially identical dimensions, the plurality of filter assemblies operable to be mounted in interfitted mating receipt with each other.

Another object is to provide such a multi-stage straining apparatus which, when mounted in fluid-flow communication with a vacuous vessel for receiving the strained paint, is adapted to eliminate substantially all contamination or other debris which might otherwise have contaminated the strained paint from the external environment.

Another object is to provide such a multi-stage straining apparatus which is adapted to produce a homogeneous paint solution from a batched source of contaminated paint and which is particularly well suited to permit the dispensing of the strained paint to an appropriate spraying apparatus.

Another object is to provide such an apparatus wherein a plurality of filter elements are readily removable from the apparatus for the purpose of cleaning, replacement or maintenance.

Another object is to provide such an apparatus wherein the vacuous vessel for receiving the strained paint solution has a base member operable to channel the solution of paint into a predetermined area so that it may be readily removed by an appropriate spraying apparatus.

Another object is to provide such a multi-stage straining apparatus which is characterized by ease of employment, simplicity of construction and which can be sold and maintained at a relatively nominal cost.

Further objects and advantages are to provide improved elements and arrangements thereof in an apparatus for the purposes described which is dependable, economical, durable and fully effective in accomplishing its intended purposes.

These and other objects and advantages are achieved in a multi-stage straining apparatus of the present invention wherein, in the preferred embodiment, a support member is borne by a vacuous vessel and has an orifice and a hose receiving station of predetermined dimensions formed therein; and a plurality of strainer assemblies of substantially identical dimension are adapted to be mounted on the support member and disposed in fluid-flow communication with the orifice, the plurality of strainer assemblies adapted to be serial mounted in interfitted telescoping receipt one with the other; and a removable filter element is individually mounted in each strainer assembly for removing the debris and foreign matter suspended in the paint solution when the paint is passed through the plurality of strainer assemblies thereby producing a homogenous paint solution, the vacuous vessel further mounting a stirring assembly operable to agitate the solution of paint to inhibit the formation of a skim film or the separation of the solution of paint into its constituent elements thus maintaining the strained paint solution in a substantially homogeneous state.

DESCRIPTION OF THE PREFERRED EMBODIMENT FIRST FORM

Figure 1:
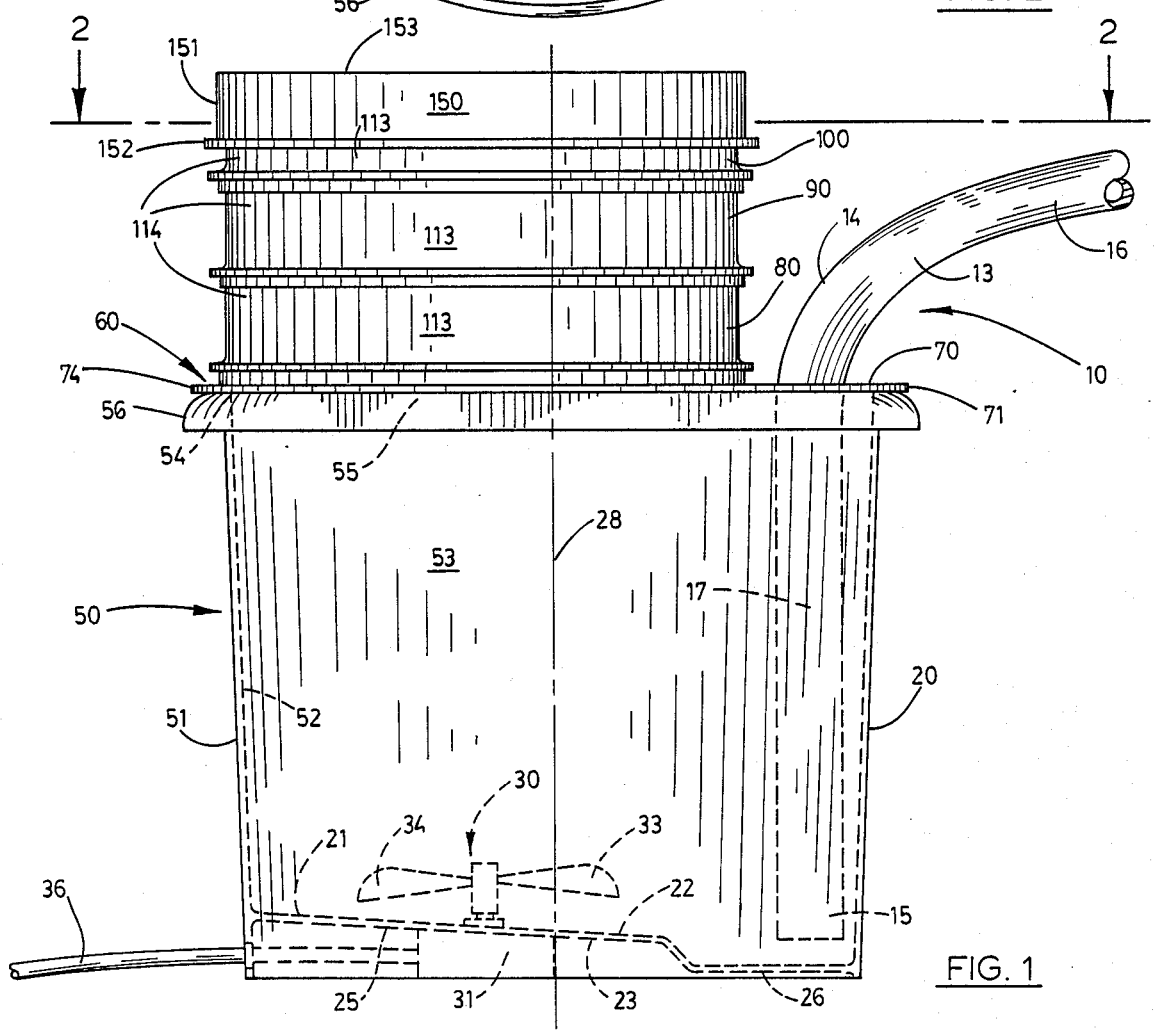
FIG. 1 is a side elevation of the first form of the apparatus of the subject invention with some underlying structure indicated in hidden lines.

Referring more particularly to the drawings, the first form of the multi-stage straining apparatus of the present invention is generally indicated by the numeral 10 in FIG. 1. As will hereinafter become more clearly apparent, the apparatus 10 is adapted to remove debris and other foreign matter from a batched solution. For purposes of illustrative convenience, the apparatus is described as it would be configured if it were employed to remove debris and foreign matter from a solution of paint which is to be supplied to a spraying apparatus, not shown. While the apparatus is described herein for straining a batched solution of paint, it will be understood that the apparatus can be employed to strain a variety of different types of solution, and therefore the invention is not to be limited to straining paint.

In order more clearly to understand the operation of the apparatus it should be understood that a solution of paint, not shown, which has been stored from a prolonged period of time, will typically separate into its component elements and these components will precipitate out of solution. As should be appreciated, this non-homogeneous solution cannot be utilized in this state. To correct this situation, the solution of paint typically is stirred or otherwise mechanically agitated to suspend the component elements thereby creating a substantially homogeneous solution. When the solution of paint is exposed to air, or to ambient temperatures of 78° F. or less, it will, within a relatively short period of time, begin to congeal or otherwise coagulate to form irregularly shaped semi-solid bodies which can, and typically do, obstruct or otherwise restrict the operation of the spraying apparatus, not shown. In this situation remixing may need to be performed frequently. In those instances where lacquers, stains, sanding sealers, and oil base paints are being applied, it should be understood that these solutions characteristically precipitate or otherwise separate into their constituent elements rapidly and therefore they require substantially continuous mixing. As earlier indicated, this precipitation or separation may cause an operational malfunction in the spraying device, however, it may cause a more serious problem, that being, the solution may be partially or totally ineffective inasmuch as the dispensed solution may not contain the appropriate volumes of constituent elements.

The spraying apparatus, not shown, is supplied with paint through a suitable dimensioned flexible spray line 13. The spray line is of conventional configuration having an outside surface 14, a first end 15, and an opposed second end 16, which is connected in fluid-flow communication with the spraying apparatus. The spray line 13 defines a fluid transferring passage 17 which allows the solution of paint to travel to the spraying apparatus.

Figure 2:
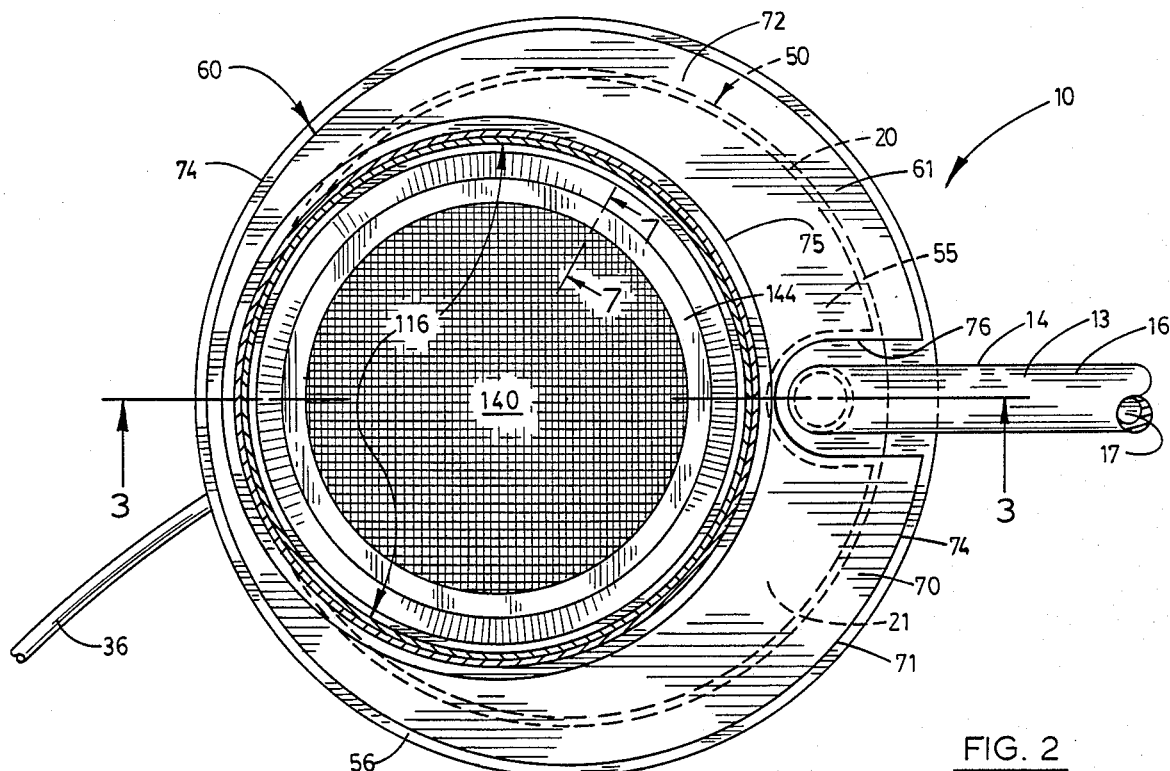
FIG. 2 is a top plan view of the first form of the apparatus of the subject invention taken from a position indicated by the line 2—2 of FIG. 1.

As best seen by reference to FIGS. 1 and 2, the apparatus 10 is mounted in fluid transferring relation on and about a vacuous storage vessel 20 which receives the paint solution which has been strained, not shown. The vacuous storage vessel 20 has a substantially circular base 21, which has a top surface 22, an opposed bottom surface 23, a peripheral edge 24, an inclined portion 25, and a depressed portion, generally indicated by the numeral 26. As should be understood, the inclined portion 25 is operable to channel the solution of paint which has been strained into the depressed portion such that it can be withdrawn from the vacuous storage vessel by the flexible spray line 13. Formed substantially centrally of the bottom surface 23 is an orifice 27 of predetermined dimension. The vacuous storage vessel further has a longitudinal axis which is generally indicated by the line labeled 28.

Figure 3:
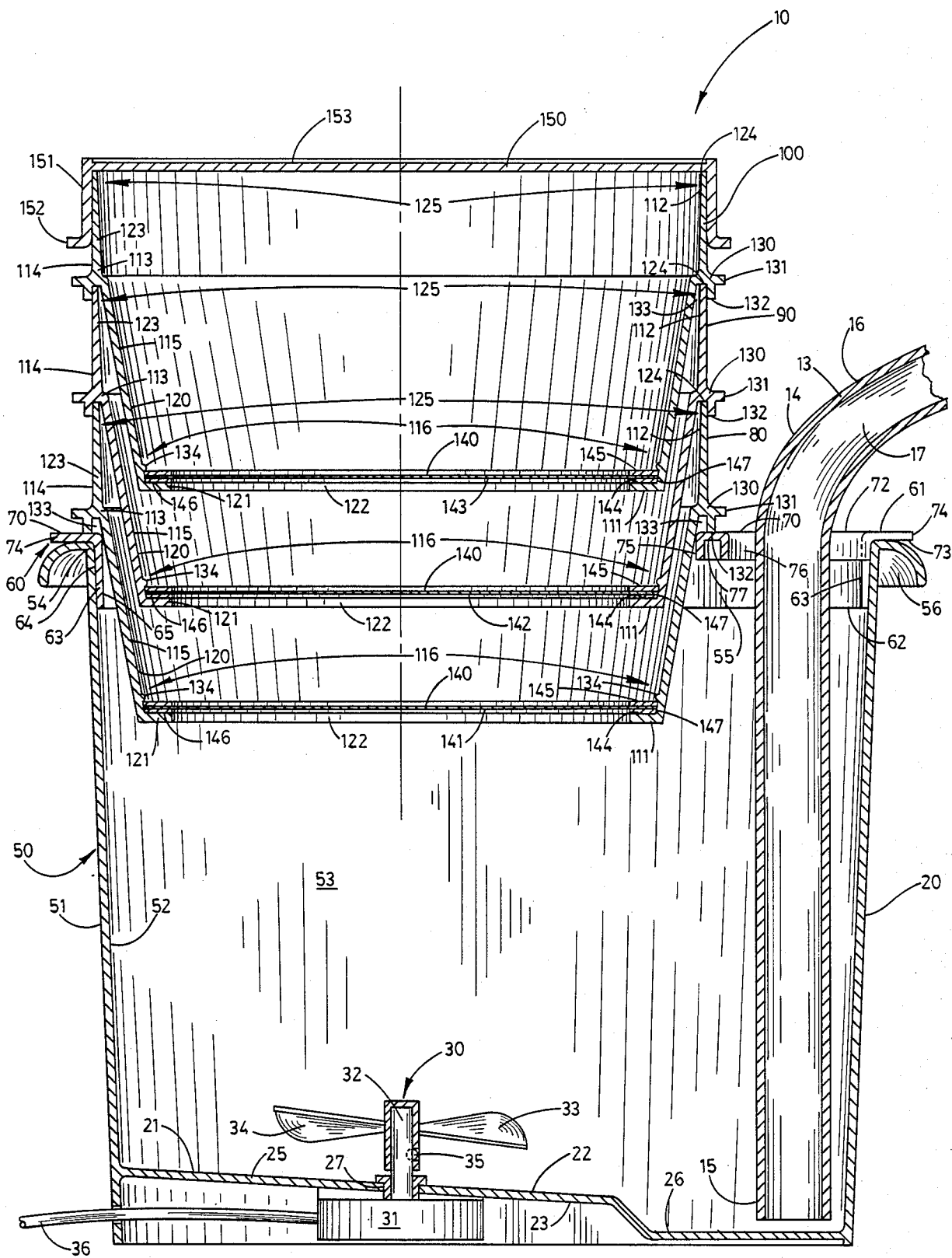
FIG. 3 is a longitudinal, vertical sectional view of the first form of the apparatus of the subject invention taken from a position indicated by the line 3—3 of FIG. 2.

A stirring or agitation assembly, which is generally indicated by the numeral 30, is mounted on the bottom surface 23 of the circular base 21. As best seen by reference to FIG. 3, an electric motor 31 is affixed to the bottom surface 23, and a shaft 32 which is borne by the electric motor, extends through the orifice 27. The shaft 32 is operable releasably to mount a paddle assembly, generally indicated by the numeral 33. The paddle assembly 33 is of conventional design having a plurality of paddle members 34 which are adapted to agitate the solution of paint which has been strained thereby preventing or inhibiting the paint from separating into its constituent elements or alternatively forming a skim film on the top surface thereof. A locking device, which is illustrated as a spring biased ball detent 35 is operable to permit the paddle assembly to be released from the shaft 32 thereby allowing the cleaning, inspection, and maintenance of same. A power cable 37, interconnects the electric motor 31 with a suitable source of electrical power, not shown. For best results, the electric motor employed should be capable of thoroughly agitating the solution of paint contained in the vacuous vessel but should not cause the formation of a vortex in the paint solution.

A continuous wall or cylindrical main body 50 of substantially unitary construction has an outside surface 51, and an inside surface 52. The inside surface 52 defines a space 53 operable to receive the paint which has been strained. The continuous wall 50 has a top edge 54 which defines a mouth 55. Extending downwardly from the top edge is a down-turned lip portion 56 which functions as a suitable hand grip for the apparatus 10. A support member 60 is slidably mounted in fitted rested receipt on and about the top edge 54 of the continuous wall 50. The support member has a first end 61 and a second end 62. A substantially cylindrically shaped side wall portion 63 has an outside surface 64 and an opposed inside surface 65. As best seen by reference to FIG. 3, the cylindrically shaped side wall portion is conformably dimensioned slidably to be received in telescoping mating relation in the mount 55 of the vacuous storage vessel 20.

The support member 60 has a supporting surface 70 which is affixed to, and extends in a substantially normal attitude with respect to, the cylindrically shaped side wall portion 63. The supporting surface 70 has a peripheral edge 71, an exterior portion 72 and an interior portion 73. The supporting surface, at the peripheral edge 71 thereof, defines a flange 74 which is operable to rest in mating engagement against the top edge 54 of the continuous wall 50. Formed in the supporting surface 70, in substantially non-coaxial alignment with the longitudinal axis 28 of the vacuous storage vessel 20, is an orifice 75 of predetermined constricted dimension. As should be understood, the orifice 75 permits fluid-flow communication with the space 53 which is defined by the continuous wall 50. As best seen by reference to FIGS. 2 and 3, a U-shaped hose receiving station 76 is formed in the supporting surface 70 of the support member 60 and is defined by a U-shaped support member 77 which is integral with, and depends downwardly from the interior portion 73. The U-shaped support member is adapted to increase the strength of the supporting surface 70. The hose receiving station is conformably dimensioned slidably to receive the flexible spray line 13.

A first, second, and third strainer assembly of substantially identical dimension, hereinafter indicated by the numerals 80, 90 and 100, respectively, are operable to be mounted on the support member 60 and disposed in fluid transferring relation with the orifice 75 formed in the supporting surface 70. As best seen by reference to FIG. 3, each strainer assembly is adapted to be serially mounted in telescoping interfitted mating receipt one with the other. Each of the strainer assemblies, 80, 90 and 100, respectively, have a first or fluid discharge end 111, a second or fluid intake end 112, and a main body 113. The main body 113 of each strainer assembly, has an outside surface 114 and an inside surface 115 which defines a chamber 116. The plurality of chambers 116 are disposed in fluid-flow communication with the space 53 which is defined by the vacuous storage vessel 20. The main body 113, of each strainer assembly has a substantially frusto-conically shaped first portion 120 which mounts at the first end 111, a substantially continuous flange 121. The flange 121 defines an orifice 112 of restricted dimension. A cylindrically shaped second portion 123 is connected to the first portion 120. The second portion 123 has a top edge 124 which defines a mount 125.

A flange assembly, which is generally indicated by the numeral 130, is affixed to the main body 113 of each strainer assembly 80, 90 and 100, respectively. The flange assembly 130 is disposed between the first portion 120, and the second portion 123, and extends substantially continuously about the main body. The flange assembly 130 includes a horizontally disposed portion 131 and a vertically disposed portion 132. The vertically disposed portion 132 defines a channel 133 which is operable slidably to receive the top edge 124 of an adjoining strainer assembly with which it is mounted in telescoping interfitted mating receipt. This is best seen by reference to FIGS. 1 and 3. A substantially continuous locking member 134 is mounted to the inside surface 115 of each strainer assembly. The locking member, which is disposed in substantially parallel fixed spaced relation to the flange 121 is operable to mount an individual filter element 140 in releasably secure facing engagement against the flange 121.

Figure 7:
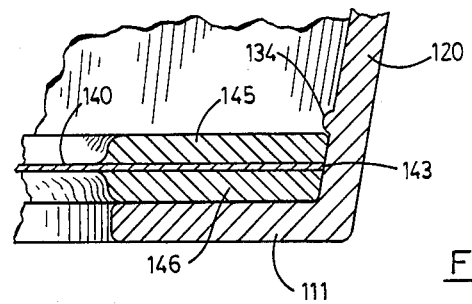
FIG. 7 is a somewhat further enlarged, partial, longitudinal, vertical section of the first form of the instant invention taken from a position indicated by line 7—7 in FIG. 2.

The first strainer assembly 80 mounts a first or fine porosity filter element 141. The second strainer assembly 90 mounts a second or medium porosity filter element 142, and the third strainer assembly 100 mounts a third or coarse porosity filter element 143. Each of the filter elements 141, 142 and 143, respectively, has a non-porous, resilient border, or frame, which is generally indicated by the numeral 144. As best seen by reference to FIG. 7, each border 144 has a first or top element 145 and a second or bottom element 146. Each border 144 further has a peripheral edge 147 of angulated configuration which permits the filter elements 140 to be held in sealably secure fluid impeding relation with respect to the flange 121. As should be understood the filter elements 140 are bonded or otherwise captured between the top and bottom elements 145 and 146 and are mounted in secure mating receipt against the flange 121 by the locking member 134. A close study of FIG. 3 reveals that the first, second, and third filter elements 141, 142 and 143, respectively, each have an overall diametral dimension which is substantially equal, and a variable pore dimension, the individual filter elements being serially disposed in the chambers 116 in the order of ever-decreasing pore size.

A dust cover, which is generally indicated by the numeral 150, is conformably dimensioned for interfitted receipt on and about the second portion 123 of the third strainer assembly 100. The dust cover, which is operably to occlude the chambers 116 and thereby prevent external contaminants from entering the vacuous storage vessel 20, has a substantially cylindrical side wall 151 which mounts a flange 152. The flange, of course, is adapted to provide a hand grip for the operator, not shown. The substantially cylindrical side wall 151 mounts a top surface 153 which rests in mating receipt against the top edge 124 of the third strainer assembly 100.

SECOND FORM

Figure 6:
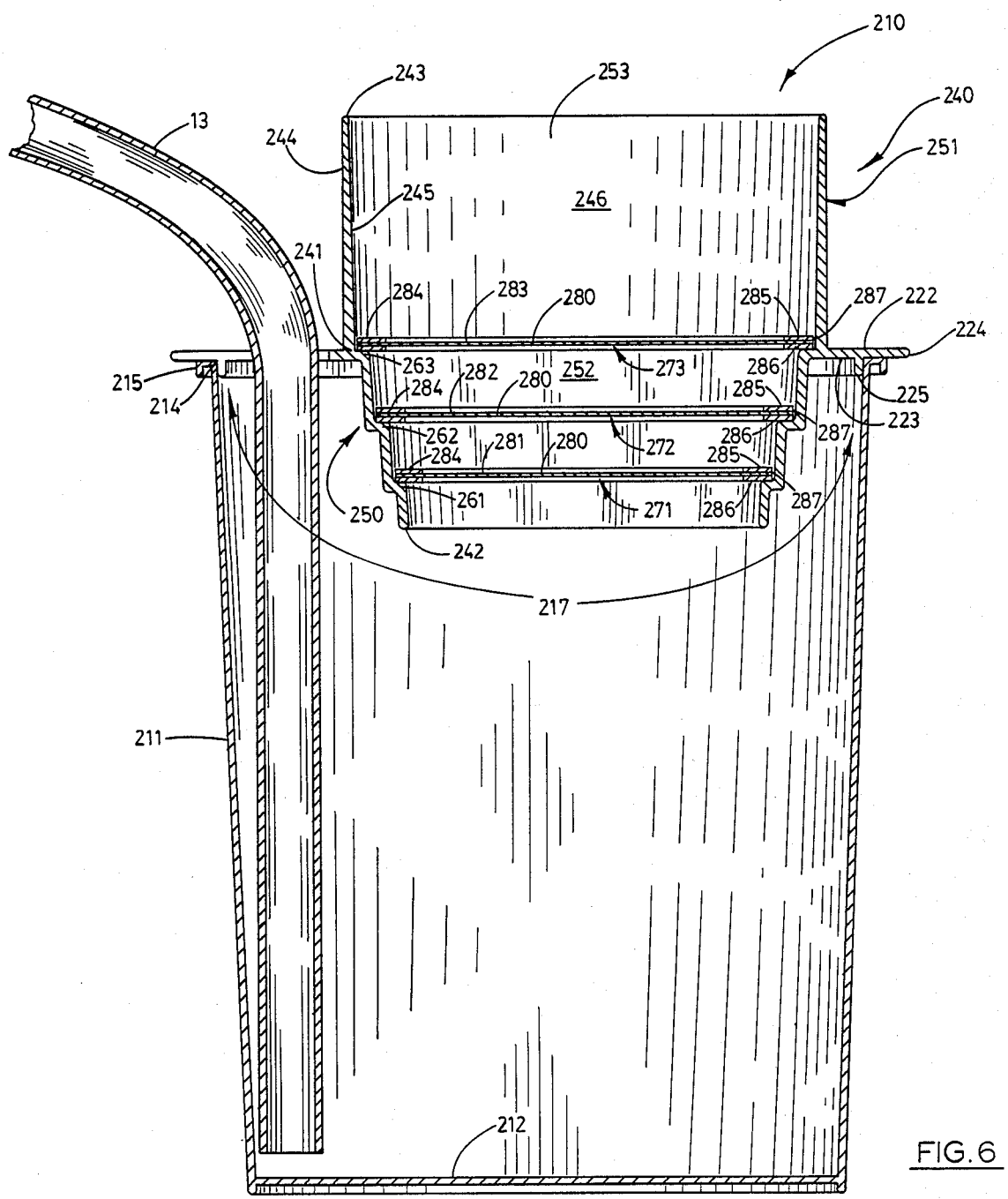
FIG. 6 is a somewhat enlarged, longitudinal, vertical section of the second form of the apparatus of the subject invention taken from a position indicated by line 6—6 of FIG. 5.

As best seen by reference to FIG. 6, the second form of the multi-stage straining apparatus of the subject invention is generally indicated by the numeral 210. The apparatus 210 is mounted in fluid-flow communication with the vacuous storage vessel 211. The vacuous storage vessel is of conventional design having a circular base or bottom surface 212 which mounts, in a substantially normal attitude, a substantially cylindrical side wall or main body 213. The cylindrical side wall 213 has a top edge 214 which mounts a flange 215. The flange 215, of course, provides a convenient hand grip for an operator, not shown. The substantially cylindrical side wall defines a space 216, and the top edge 214 defines a mount 217.

Figure 5:
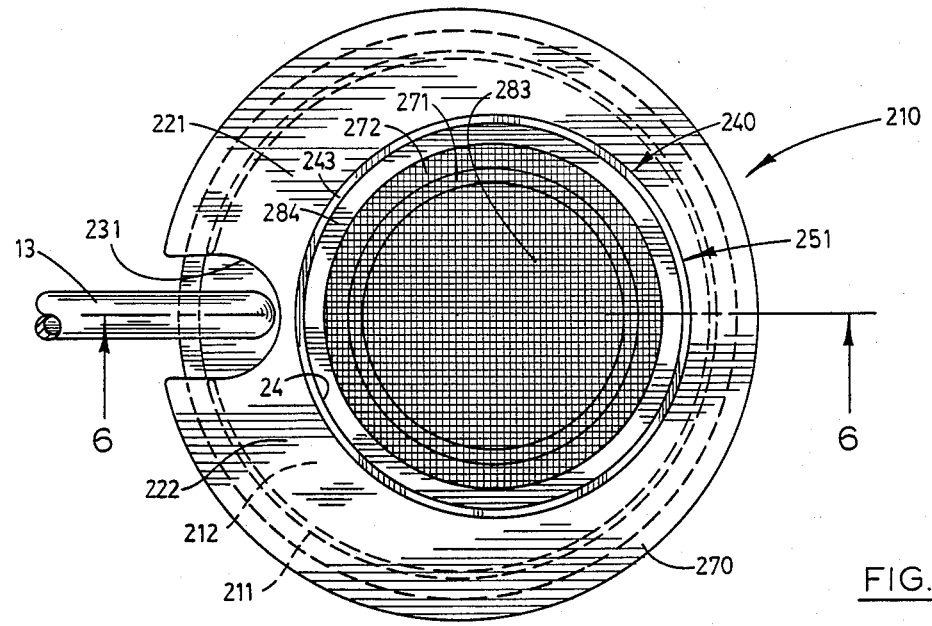
FIG. 5 is a top plan view of the second form of the apparatus of the subject invention.
Figure 4:
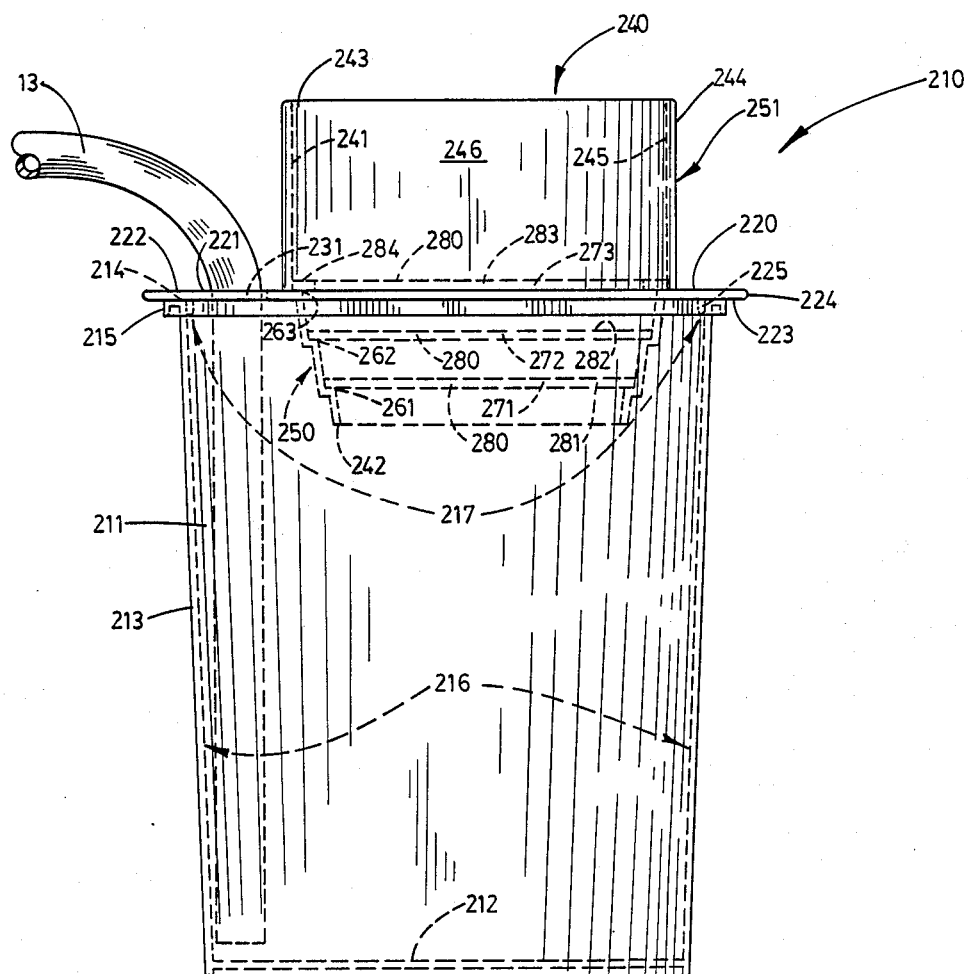
FIG. 4 is a side elevation of the second for of the apparatus of the subject invention with some underlying structure shown in hidden lines.

As best seen by reference to FIGS. 4 and 5, a support member 220 has a supporting surface 221, an outwardly facing portion 222, and an inwardly facing portion 223. The support member, which is mounted on the vacuous storage vessel 211 and in substantially constricted relation to the mouth 217, has a peripheral edge 224 and further mounts a substantially vertically disposed flange 225 which is operable to secure and position the support member 220 in rested mating receipt against the top edge 214. A hose receiving station 231 is formed in the supporting surface 221. The straining assembly which is generally indicated by the numeral 240 is affixed to or otherwise integral with the support member and is disposed in fluid flow communication with the vacuous storage vessel 211. The hose receiving station, of course, is dimensioned to receive the flexible spray line 13. It should be understood that the support member 220 can be manufactured such that it is not integral with the strainer assembly 240. That is, an orifice can be formed in the support member and the strainer assembly can be manufactured as a separate assembly which rests on the support member and is disposed in fluid flow communication with the orifice.

The strainer assembly of the second form 240 has a main body 241 which has a first or fluid discharge end 242, and a second or fluid-intake end 243. The main body further has an outside surface 244, and an inside surface 245, which defines a chamber 246. The main body 241 has a first, generally frustoconically shaped portion 250, and a second substantially cylindrically shaped portion 251. Similarly, the chamber 246 has a first portion 252 which has an ever decreasing diametral dimension and a second portion 253 which has a substantially uniform diametral dimension. The first portion 250 of the main body 241 has a first, second and third recessed area, generally indicated by the numerals 261, 262, and 263, which individually define a first mounting station 271, a second mounting station 272, and a third mounting station 273. The mounting stations, of course, are operable to mount in predetermined fixed spaced relation, individual filter elements which are generally indicated by the numeral 280.

A plurality of filter elements, which are generally indicated by the numeral 280, are serially mounted in the chamber 246 in the order of ever decreasing pore size and overall diametral dimension. A first, or fine porosity filter element 281 is mounted in rested mating relation in the first mounting station 271. A second or medium porosity filter element 282 is similarly mounted in fixed substantially parallel spaced relation to the first filter element in the second mounting station 272. Finally the third or coarse porosity filter element 283 is received in the third mounting station 273. Each of the filter elements 281, 282 and 283, respectively, has a border or frame member 284 which includes a first or top portion 285 and a second or bottom portion 286. It should be understood that the filter medium, which is typically manufactured out of a suitably dimensioned mesh screen or other similar material, is sandwiched between or otherwise bonded to the first and second portion in sealably secure fluid impeding relation. The border or frame 284 has a peripheral edge 287. As best imagined by reference to FIG. 5, the second form of the invention 240 can be adapted to receive an optional dust cover, not shown, which is operable to prevent external contaminant from reaching the space 216 which is defined by the substantially cylindrical side wall 213.

OPERATION

The operation of the described embodiments of the present invention is believed to be readily apparent and is briefly summarized at this point.

The apparatus 10 and 210, which are adapted to remove debris and foreign matter from a solution of paint, not shown, are mounted in fluid-flow communication with a vacuous storage vessel 20 and 211 by a support member 60 and 220, respectively. Each apparatus has a strainer assembly 80, 90, 100 and 240, respectively which has a substantially cylindrical main body 113 and 241. Each strainer assembly further mounts a plurality of removably filter elements 140 and 280, respectively, which are adapted to remove any debris and foreign matter which may be suspended in the solution of paint when it is passed through the apparatus. The plurality of filter elements each have a variable pore dimension, that is, the individual filter elements are mounted serially in the order of ever decreasing pore size to capture debris and foreign matter of ever decreasing dimensions.

To employ the first form of the apparatus 10 an operator simply places the plurality of filter elements 140 in their respective positions and thereafter pours the solution of paint, not shown, into the apparatus. The solution of paint moves by the force of gravity, through the plurality of filter elements and is collected in the vacuous vessel 20. The paint is dispensed or otherwise withdrawn from the vacuous vessel through the spray line 13. The first form of the invention further has a stirring assembly 30 which is operable to prevent or otherwise inhibit the separation of the solution of paint into its constituent elements or the formation of a skim film on the top surface. This, of course, prevents clogging of the spraying apparatus, not shown. A close study of FIG. 3 reveals that the vacuous storage vessel 20 has a bottom surface 21 which is operable to funnel or otherwise channel the solution of paint which has been strained to a depressed portion 26, such that it can be removed by the spray line 13.

The operation of the second form of the invention is substantially identical to the first form with the exception that the vacuous storage vessel 211 does not mount a stirring assembly. Of course, it should be understood that the stirring assembly could be readily mounted to same.

Therefore, it will be seen that the apparatus 10 for removing debris and foreign matter from a solution of paint and the like of the present invention operates to provide a fully dependable and practical means for producing a homogeneous solution of paint rapidly and conveniently, while reducing to an absolute minimum the possibility of clogging or otherwise obstructing the spray line of a conventionally configured spraying apparatus, and which is both of sturdy and dependably construction and is relatively inexpensive to manufacture and maintain.

Although the invention has been herein shown and described in what are conceived to be the most practical and preferred embodiments, it is recognized that departures may be made therefrom within the scope of the invention which is not to be limited to the illustrative details disclosed.

Having described my invention, what I claim as new and desire to secure by Letters Patent is:

1. A multi-stage straining apparatus for removing foreign matter from a solution of paint or the like, the apparatus comprising:
  a vacuous vessel for receiving the paint solution that has been strained;
  a support member borne by the vacuous vessel and having formed therein an orifice and a hose receiving station of predetermined dimensions;
  a plurality of strainer assemblies mounted on the support member and disposed in fluid communication with the orifice, the plurality of strainer assemblies serially mounted in interfitted mating relation with each other and defining a chamber, each strainer assembly having a main body of substantially identical dimension and each main body further having a substantially frusto-conically shaped first portion, and a substantially cylindrically shaped second portion is interconnected with the first portion and defines a top edge, the main body of each strainer assembly mounting between the first and second portions a flange operable matingly to engage the top edge of an adjoining strainer assembly, the first portion of each strainer assembly dimensioned for telescoping interfitted receipt internally of the adjoining strainer assembly; and
  a removably filter element individually mounted in the first portion of each strainer assembly for removing foreign matter suspended in the paint solution when the paint is passed through the chamber to produce a homogeneous paint solution.

2. The apparatus of claim 1 wherein the vacuous vessel has a bottom surface, with an inclined portion and a depressed portion, the inclined portion operable to channel the solution of paint which has been strained to the depressed portion.

3. The apparatus of claim 2 wherein the filter elements have different pore dimensions, one from another and substantially equal diametral dimensions, the plurality of filter elements serially disposed in the chamber in the order of ever decreasing pore size to remove debris and foreign matter of various dimensions from the solution of paint which is passed through the chamber.

4. The apparatus of claim 3 wherein a dust cover is borne by one of the strainer assemblies, the dust cover substantially occluding the chamber to prevent external contaminants from reaching the chamber, and a stirring assembly is mounted on the base and operable to agitate the paint which has been strained to inhibit the separation of the paint into its constituent elements or the formation of a skim film on the top surface thereof.

5. A multi-stage straining apparatus for selectively removing foreign matter which is suspended in a solution of paint, the apparatus comprising:
  a vacuous vessel for receiving the paint which has been strained, the vacuous vessel having a top edge, a substantially cylindrical side wall, and a bottom surface, the bottom surface having an inclined portion and a depressed portion, the inclined portion operable to channel the solution of paint which has been strained to the depressed portion;
  a support member slidably mounted in fitted relation on the top edge of the vacuous vessel and having a substantially cylindrically shaped side wall which is dimensioned to be received in slidable telescoping relation internally of the vacuous vessel, the cylindrical side wall further mounting a supporting surface which has formed therein an orifice and a hose receiving station disposed in fluid communication with the vacuous vessel;
  a first strainer assembly mounted on the support member and slidably received in substantially telescoping mating relation with the orifice and having a main body with a substantially frusto-conically shaped first portion, and a second portion unitary with the first portion and having a substantially cylindrically shaped side wall and a top edge, and a flange assembly mounted on the main body and disposed between the first and second portion and operable to engage the supporting surface of the support member and thereby support the first strainer in a predetermined attitude on the support member;

a second strainer assembly mounted on the support member and disposed in slidable telescoping relation in the first strainer assembly and having a main body with a substantially frusto-conically shaped first portion, and a second portion unitary with the first portion and having a substantially cylindrical side wall and a top edge, and a flange assembly mounted on the main body operable to engage the top edge of the first strainer assembly;

a third strainer assembly mounted on the support member and disposed in slidable telescoping relation internally of the second strainer assembly and having a main body with a substantially frusto-conically shaped first portion, and a second portion unitary with the first portion and having a substantially cylindrical side wall and a top edge, and a flange assembly mounted on the main body and disposed between the first and second portion operable to engage the top edge of the second strainer assembly; and first, second, and third removable filter elements individually mounted in the first portions of the first, second and third strainer assemblies, respectively, whereby the apparatus is adapted to receive a solution of paint in the third strainer assembly for passage through the third, second and first removable filter elements and into the vacuous storage vessel so that the individual filter elements remove the foreign matter suspended in the solution of paint to produce a homogeneous paint solution.

6. The apparatus of claim 5 wherein the first, second and third removable filter elements have overall diametral dimensions which are substantially equal and different pore dimensions, one from another, said filter elements being serially disposed in the order of ever decreasing pore size.

7. The apparatus of claim 5 wherein the first, second, and third strainer assemblies each have an inside surface and first and second ends, and a flange is mounted on the first end of each strainer assembly, each flange supporting the individual removable filter element in an operational attitude internally of the individual strainer assemblies and a locking member mounted on the inside surface disposed in fixed spaced, substantially parallel relation to the flange and operable releasably to mount the individual filter element in secure facing engagement against the flange.

8. The apparatus of claim 7 wherein the removable filter elements each have a non-porous resilient frame member which is mounted on the peripheral edge of the filter element, the frame member adapted to be captured in fluid impeding relation between the locking member and the flange.

9. The apparatus of claim 8 wherein a stirring assembly is borne by the bottom surface of the vacuous vessel and is operable to agitate the solution of paint which has been strained to prevent the separation of the solution of paint into its constituent elements or the formation of a skim film on the top surface thereof.

10. The apparatus of claim 5 wherein the orifice is disposed in non-coaxial alignment with the vacuous vessel and the supporting surface has a peripheral edge which defines a flange, which is adapted to rest in mating relation on the top edge of the vacuous vessel and thereby position the support member in a predetermined attitude with respect to the vacuous vessel.

11. The apparatus of claim 5 wherein a dust cover is releasably mounted in interfitted, rested relation on the top edge of the third strainer assembly, the dust cover operable to occlude the third strainer thus preventing external contaminants from reaching the vacuous vessel, and the main bodies of the strainer assemblies are of substantially identical dimensions.

12. A multi-stage straining apparatus for removing foreign matter from a solution of paint or the like, the apparatus comprising:

a vacuous vessel for receiving the paint solution that has been strained, the vacuous vessel having a top edge defining a mouth;

a support member slidably mounted in rested, fitted relation on the top edge of the vacuous vessel and in substantially constricting relation to the mouth thereof, the support member having formed therein a hose receiving station;

a straining assembly affixed on the support member and having a main body of unitary construction disposed in fluid communication with the vacuous vessel, the main body having an inside surface defining a chamber, and the chamber having a first portion of substantially decreasing diametral dimension and a second portion of substantially uniform diametral dimension; and a plurality of removable filter elements mounted in fixed, spaced relation in the first portion of the chamber, the elements adapted to remove foreign matter suspended in the paint solution when the paint is passed through the chamber thereby producing a substantially homogeneous paint solution.

13. The apparatus of claim 12 wherein a plurality of mounting stations are formed in the inside surface of the main body in the first portion of the chamber, the mounting stations operable to support the individual filter elements in substantially parallel, fixed, spaced relation.

14. The apparatus of claim 13 wherein the filter elements have different pore sizes and different diametral dimensions, the individual filter elements being serially mounted in the chamber in the order of ever decreasing pore size and diametral dimension.

15. The apparatus of claim 13 wherein the support member mounts a substantially continuous flange which is adapted to engage the vacuous vessel, the flange operable to position the support member in a predetermined attitude in the mouth of the vacuous vessel.

16. A multi-stage straining apparatus for removing foreign matter from a solution of paint or the like, the apparatus comprising:

a vacuous vessel for receiving the paint solution that has been strained;

a support member borne by the vacuous vessel and having formed therein an orifice and a hose receiving station of predetermined dimensions;

a plurality of strainer assemblies mounted on the support member and disposed in fluid communication with the orifice, the strainer assemblies serially mounted in interfitted mating relation with each other and defining a chamber, the individual strainer assemblies each having a main body of substantially identical dimensions, the main bodies further having first and second portions, the first portion dimensioned for interfitted receipt internally of the second portion of an adjoining strainer assembly, and a removable filter element mounted in the first portion of each strainer assembly for removing foreign matter suspended in the paint solution when the paint is passed through the chamber thereby producing a substantially homogeneous paint solution.

17. The apparatus of claim 16 wherein the filter elements have different pore dimensions, one from another, and substantially equal diametral dimensions, the plurality of filter elements serially disposed in the chamber in the order of ever decreasing pore size to remove debris and foreign matter of various dimensions from the solution of paint which is passed through the chamber.

* * * * *

UNITED STATES PATENT AND TRADEMARK OFFICE
CERTIFICATE OF CORRECTION

PATENT NO. : 4,816,148
DATED : March 28, 1989
INVENTOR(S) : Edward B. Hemman

It is certified that error appears in the above-identified patent and that said Letters Patent is hereby corrected as shown below:

Column 4, line 15, delete "for" and substitute ---form---.

Column 5, line 9, delete "suitable" and substitute ---suitably---.

Column 6, line 5, delete "mount" and substitute ---mouth---.

Column 6, line 50, delete "112" and substitute ---122---.

Column 6, line 54, delete "mount" and substitute ---mouth---.

Column 7, line 58, delete "mount" and substitute ---mouth---.

Column 8, line 56, delete "contaminant" and substitute ---contaminants---.

Column 9, line 3, delete "removably" and substitute ---removable---.

Column 9, line 45, delete "dependably" and substitute ---dependable---.

Signed and Sealed this

Seventh Day of November, 1989

*Attest:*

JEFFREY M. SAMUELS

*Attesting Officer*    *Acting Commissioner of Patents and Trademarks*